(12) United States Patent
Palanki et al.

(10) Patent No.: US 9,078,164 B2
(45) Date of Patent: Jul. 7, 2015

(54) METHOD AND APPARATUS FOR CONDUCTING MEASUREMENTS WHEN MULTIPLE CARRIERS ARE SUPPORTED

(71) Applicant: QUALCOMM Incorporated, San Diego, CA (US)

(72) Inventors: Ravi Palanki, Cupertino, CA (US); Peter Gaal, San Diego, CA (US); Parag A. Agashe, San Diego, CA (US); Rajat Prakash, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/165,498

(22) Filed: Jan. 27, 2014

(65) Prior Publication Data
US 2014/0140239 A1    May 22, 2014

Related U.S. Application Data

(62) Division of application No. 12/895,665, filed on Sep. 30, 2010, now Pat. No. 8,638,682.

(60) Provisional application No. 61/247,767, filed on Oct. 1, 2009.

(51) Int. Cl.
 *H04L 12/26* (2006.01)
 *H04W 4/00* (2009.01)
 (Continued)

(52) U.S. Cl.
 CPC ............. *H04W 24/08* (2013.01); *H04L 1/1887* (2013.01); *H04L 5/0053* (2013.01); *H04L 5/0094* (2013.01); *H04L 5/14* (2013.01); *H04W 24/10* (2013.01)

(58) Field of Classification Search
 USPC ................. 370/310–350, 229–240, 252, 431, 370/436–437, 464, 468, 477–480
 See application file for complete search history.

(56) References Cited

U.S. PATENT DOCUMENTS

| 6,535,739 B1 | 3/2003 | Chen et al. |
| 6,563,806 B1 | 5/2003 | Yano et al. |

(Continued)

FOREIGN PATENT DOCUMENTS

| CN | 1852554 A | 10/2006 |
| CN | 101523823 A | 9/2009 |

(Continued)

OTHER PUBLICATIONS

Ericsson: "UL Transmissions during Measurement Gaps" 3GPP Draft; R2-083355, 3rd Generation Partnership Project (3GPP), Mobile Competence Centre; 650, Route Des Lucioles; F-06921 Sophia-Antipolis Cedex ; France, vol. RAN WG2, No. Warsaw, Poland; 20080624, Jun. 24, 2008, XP050140755.

(Continued)

Primary Examiner — Tri H Phan
(74) Attorney, Agent, or Firm — Paul Kuo

(57) ABSTRACT

Measurements are conducted on one or more carriers in a case where an access terminal supports reception on multiple carriers. Upon determining that an access terminal is capable of concurrently receiving on a given set of carriers, a measurement is conducted on one or more carriers of the set while receiving on or more other carriers of the set. Conversely, upon determining that an access terminal is not capable of concurrently receiving on a given set of carriers, a measurement is conducted on one or more carriers of the set while not receiving on or more other carriers of the set. In addition, data transfers to or from an access terminal on a carrier may be restricted (e.g., data transfers not scheduled or only low priority data transfers scheduled) during one or more subframes before or after the access terminal conducts a measurement on another carrier.

22 Claims, 10 Drawing Sheets

(51) Int. Cl.
| | |
|---|---|
| *H04J 3/16* | (2006.01) |
| *H04J 4/00* | (2006.01) |
| *H04W 24/08* | (2009.01) |
| *H04L 1/18* | (2006.01) |
| *H04L 5/00* | (2006.01) |
| *H04L 5/14* | (2006.01) |
| *H04W 24/10* | (2009.01) |

(56) References Cited

U.S. PATENT DOCUMENTS

| | | | |
|---|---|---|---|
| 7,016,320 B1* | 3/2006 | Petersson et al. | 370/331 |
| 7,046,650 B2* | 5/2006 | Sherman | 370/338 |
| 7,145,940 B2 | 12/2006 | Gore et al. | |
| 7,164,669 B2 | 1/2007 | Li et al. | |
| 7,280,467 B2* | 10/2007 | Smee et al. | 370/208 |
| 7,489,943 B2* | 2/2009 | Jones | 455/522 |
| 7,496,048 B2* | 2/2009 | Ikeda et al. | 370/252 |
| 7,656,842 B2 | 2/2010 | Thomas et al. | |
| 7,821,913 B2 | 10/2010 | Malladi et al. | |
| 8,068,835 B2 | 11/2011 | Parekh et al. | |
| 8,077,691 B2 | 12/2011 | Kadous et al. | |
| 8,111,709 B2 | 2/2012 | Hunukumbure et al. | |
| 8,169,953 B2 | 5/2012 | Damnjanovic et al. | |
| 8,451,951 B2 | 5/2013 | Caire et al. | |
| 8,638,682 B2 | 1/2014 | Palanki et al. | |
| 8,724,570 B2* | 5/2014 | Lee et al. | 370/329 |
| 2006/0251014 A1* | 11/2006 | Castor et al. | 370/329 |
| 2007/0004465 A1* | 1/2007 | Papasakellariou et al. | 455/571 |
| 2008/0056183 A1* | 3/2008 | Gorokhov et al. | 370/329 |
| 2010/0190487 A1 | 7/2010 | Wang et al. | |
| 2011/0090817 A1* | 4/2011 | Qu et al. | 370/254 |
| 2011/0261704 A1* | 10/2011 | Etemad | 370/252 |
| 2012/0113866 A1 | 5/2012 | Tenny et al. | |
| 2012/0269152 A1* | 10/2012 | Hong et al. | 370/329 |

FOREIGN PATENT DOCUMENTS

| | | |
|---|---|---|
| JP | 2003516066 A | 5/2003 |
| JP | 2010506446 A | 2/2010 |
| JP | 2010516185 A | 5/2010 |
| JP | 2011518471 A | 6/2011 |
| KR | 20140063815 A | 5/2014 |
| WO | WO-0141492 A1 | 6/2001 |
| WO | WO-0178440 A1 | 10/2001 |
| WO | WO-2006105307 A1 | 10/2006 |
| WO | WO-2006125149 A2 | 11/2006 |
| WO | WO-2007050920 | 5/2007 |
| WO | WO-2008040448 A1 | 4/2008 |
| WO | WO-2008042225 A2 | 4/2008 |
| WO | WO-2008085952 A1 | 7/2008 |
| WO | WO-2008149534 A1 | 12/2008 |
| WO | WO-2009117658 A1 | 9/2009 |
| WO | WO-2009132246 A2 | 10/2009 |

OTHER PUBLICATIONS

European Search Report—EP12007937—Search Authority—Munich—Mar. 21, 2013.
"Evolved Universal Terrestrial Radio Access (E-UTRA) and Evolved Universal Terrestrial Radio Access (E-UTRAN); Overall description; Stage 2 (3GPP TS 36.300 version 8.4.0 Release 8); ETSI TS 136 300", ETSI Standards, LIS, Sophia Antipolis Cedex, France, vol. 3-R2, No. V8.4.0, Apr. 1, 2008, XP014041816, ISSN: 0000-0001 chapters: 10.1.1.2; 10.1.3; 10.1.3.2.
International Search Report and Written Opinion—PCT/US2010/051229—ISA/EPO—Jun. 8, 2011.
LG Electronics Inc., "Discussion on Measurement for CA," 3GPP TSG-RAN WG2 #66bis, R2-093877, Jun. 23, 2009.
QUALCOMM Europe: "Dual Carrier operation for Cell DCH", 3GPP Draft; R1-081438, 3rd Generation Partnership Project (3GPP), Mobile Competence Centre ; 650, Route Des Lucioles ; F-06921 Sophia-Antipolis Cedex ; France, vol. RAN WGI, No. Shenzhen, China; 20080326, Mar. 26, 2008, XP050109855, [retrieved on Mar. 26, 2008] chapter: 2.3.
TSG-RAN WGI: "LS on L1 impact of measurement gaps", 3GPP Draft; R2-083059 R1-082222, 3rd Generation Partnership Project (3GPP), Mobile Competence Centre ; 650, Route Des Lucioles ; F-06921 Sophia-Antipolis Cedex ; France, vol. RAN WG2, No. Warsaw, Poland; 20080614, Jun. 14, 2008, XP050140522, [retrieved on Jun. 14, 2008] chapter 1.

* cited by examiner

METHOD AND APPARATUS FOR CONDUCTING MEASUREMENTS WHEN MULTIPLE CARRIERS ARE SUPPORTED

CLAIM OF PRIORITY

The present application is a division of U.S. application Ser. No. 12/895,665 entitled "METHOD AND APPARATUS FOR CONDUCTING MEASUREMENTS WHEN MULTIPLE CARRIERS ARE SUPPORTED" filed Sep. 30, 2010, granted as U.S. Pat. No. 8,638,682 issued on Jan. 28, 2014 which application claims the benefit of and priority to U.S. Provisional Patent Application No. 61/247,767, filed Oct. 1, 2009, the disclosure of which is hereby incorporated by reference herein in its entirety.

BACKGROUND

1. Field

This application relates generally to wireless communication and more specifically, but not exclusively, to performing measurements in a carrier aggregation scenario.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

Some of these access terminals may support the concurrent use of multiple carriers. For example, in a carrier aggregation scenario, an access point may allocate several carriers for communication between the access point and an access terminal. Here, the number of carriers allocated may be based on the number of carriers that the access terminal may concurrently support and the traffic load of the access terminal.

An access terminal may support multiple carriers through the use of one or more receivers (e.g., receiver front-ends). For example, the available radiofrequency (RF) spectrum for a network may be divided into a set of bands (each of which has a corresponding bandwidth). These bands may or may not be contiguous within the RF spectrum. Several carriers are defined within each band, whereby a given carrier corresponds to a nominal carrier frequency and associated bandwidth. In the event contiguous carriers are allocated to an access terminal, the access terminal may be able to use a single receiver to receive data on these carriers (e.g., by tuning the receiver to acquire data over the collective bandwidth of these carriers). Conversely, if non-contiguous carriers (e.g., carriers in different bands) are allocated to an access terminal, the access terminal may need to use multiple receivers to receive data on these carriers.

In general, at a given point in time, an access terminal will be served by a given access point in the network. As the access terminal roams throughout this geographical area, the access terminal may move away from its serving access point and move closer to another access point. In addition, signal conditions within a given cell may change, whereby an access terminal may be better served by another access point. In these cases, to maintain mobility for the access terminal, the access terminal may be handed-over from its serving access point to the other access point.

To facilitate such access terminal mobility, an access terminal conducts searches for signals from nearby access points in an attempt to ensure, for example, that the "best" handover candidate may be readily identified when signal conditions at the current cell deteriorate. For example, an access terminal may regularly monitor for (i.e., measure) pilot signals from nearby access points to identify potential target access points to which the access terminal may be handed-over. In some cases, these access points may operate on a different carrier than the current serving access point. Thus, this measurement may involve measuring on different carriers (i.e., inter-frequency measurements). Conducting a measurement on one carrier may, however, impact the ability to receive on another carrier.

Conventionally, measurement gaps are employed for inter-frequency measurements whereby transmissions from an access point to an access terminal on one carrier are temporarily stopped while the access terminal conducts a pilot measurement on another carrier. However, the use of these measurements gaps may negatively impact throughput on the non-measured carrier. Thus, there is a need for effective techniques for conducting inter-carrier measurements.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to conducting measurements on one or more carriers in a case where an access terminal supports communication on multiple carriers. For example, if it is determined that an access terminal is capable of concurrently receiving on a given set of carriers, a measurement may be conducted on one or more carriers of the set while receiving data on one or more other carriers of the set (e.g., a measurement gap is not used in this case). Conversely, if it is determined that an access terminal is not capable of concurrently receiving on a given set of carriers, a measurement may be conducted on one or more carriers of the set while not receiving data on one or more other carriers of the set (e.g., a measurement gap is used in this case).

In some aspects, a measurement scheme may involve configuring an access terminal to receive data on at least one first carrier, determining that the access terminal is to conduct a pilot measurement on at least one second carrier, determining whether the access terminal can concurrently receive on the at least one first carrier and the at least one second carrier, and conducting the pilot measurement in a manner that is based on the determination of whether the access terminal can concurrently receive on the at least one first carrier and the at least one second carrier.

The disclosure relates in some aspects to restricting data transfers to or from an access terminal on one carrier during one or more subframes if the access terminal is conducting a measurement on another carrier. Here, restricting data transfers may include, for example, not scheduling data transfers on a carrier or only scheduling low priority data transfers on the carrier.

In some aspects, a measurement scheme may involve determining when an access terminal is to conduct a pilot measurement on at least one carrier, identifying at least one subframe that will occur before or after the access terminal conducts the pilot measurement, and restricting data transfers to or from the access terminal on at least one other carrier during the identified at least one subframe.

BRIEF DESCRIPTION OF THE DRAWINGS

These and other sample aspects of the disclosure will be described in the detailed description and the appended claims that follow, and in the accompanying drawings, wherein:

Figure 1:
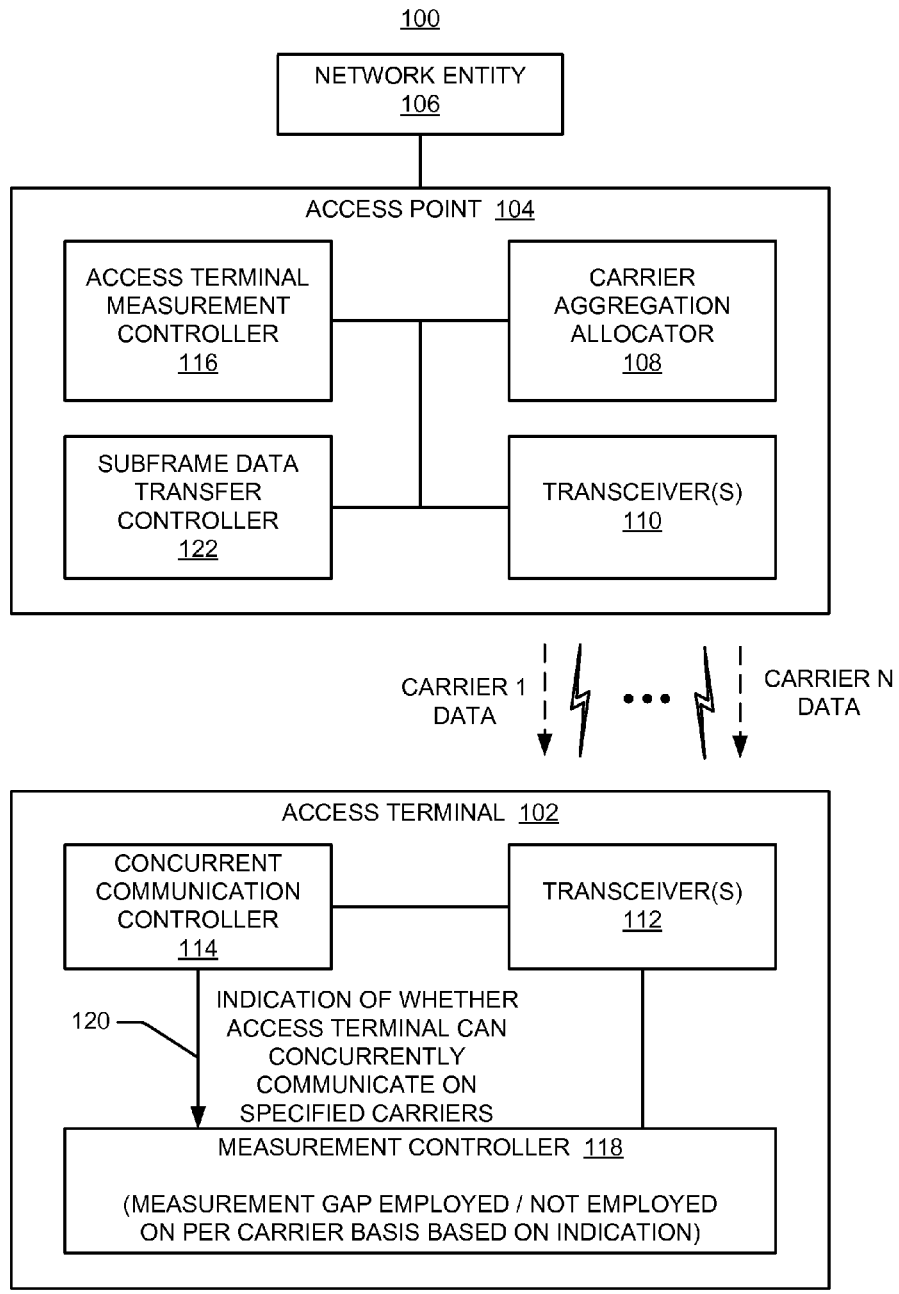
FIG. 1 is a simplified block diagram of several sample aspects of a communication system where measurements are made in a multiple carrier scenario.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a cellular communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, and so on, while access terminals may be referred to or implemented as user equipment (UEs), mobile stations, and so on.

Access points in the system 100 provide access to one or more services (e.g., network connectivity) for one or more wireless terminals (e.g., access terminal 102) that may be installed within or that may roam throughout a coverage area of the system 100. For example, at various points in time the access terminal 102 may connect to an access point 104 or some access point in the system 100 (not shown). Each of these access points may communicate with one or more network entities (represented, for convenience, by network entity 106) to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. Also, two of more of these network entities may be co-located and/or two or more of these network entities may be distributed throughout a network.

For purposes of illustration, various aspects of the disclosure will be described in the context of a carrier aggregation scheme whereby a network (e.g., an access point) may allocate multiple carriers for communication with an access terminal that is capable of communicating on multiple carriers. Here, the access point includes one or more transceivers for concurrently communicating (e.g., transmitting) on different carriers. Similarly, the access terminal includes one or more transceivers for concurrently communicating (e.g., receiving) on different carriers. In some cases, a given device may use a single transceiver for concurrently communicating on multiple carriers (e.g., on contiguous carriers) by appropriate configuration of the transceiver (e.g., by tuning a front-end of an RF receiver to receive multiple carriers). It should be appreciated that the teachings herein may be applicable to other scenarios.

In accordance with the teachings herein, measurement gaps may or may not be used on a first carrier when conducting measurements on a second carrier depending on whether the access terminal 102 is capable of concurrently receiving on the first carrier and the second carrier. In addition, the access point 104 may restrict data transfers to or from the access terminal 102 on a first carrier during one or more subframes that coincide with measurements by the access terminal 102 on a second carrier.

In the example of FIG. 1, the access point 104 includes a carrier aggregation allocator 108 that may allocate multiple carriers for traffic between the access point 104 and the access terminal 102. In some aspects, multiple carriers may be allocated depending on the traffic load between the access terminal 102 and the access point 104. Also, depending on the signal quality observed on various carriers, the access point 104 may allocate specific carriers (e.g., the highest quality carriers as seen by the access terminal 102) for the access terminal 102. It should be appreciated that such carrier allocation may be performed by another network entity in some implementations.

The access point 104 includes one or more transceivers as represented by the transceiver(s) 110. As shown in FIG. 1, the transceiver(s) 110 are operable to concurrently transmit downlink data to the access terminal 102 on different carriers as represented by the carrier 1-carrier N symbols in FIG. 1. Complementary operations may be performed on the uplink.

The access terminal 102 also includes one or more transceivers as represented by the transceiver(s) 112. The transceiver(s) 112 are operable to concurrently receive downlink data on the different carriers transmitted by the access point 104. Complementary operations may be performed on the uplink.

A concurrent communication controller 114 determines whether the access terminal 102 can concurrently communicate on specific carriers and, if so, configures the transceiver(s) 112 for concurrent communication. For example, the concurrent communication controller 114 may configure (e.g., by changing the tuning of) a given receiver to receive data on several carries (e.g., contiguous carriers) or may configure different receivers to receive data on different carriers.

At some point in time, the access terminal 102 will conduct a measurement on one or more of the allocated carriers. For example, in a typical implementation, an access terminal measurement controller 116 of the access point 104 may specify when a measurement controller 118 of the access terminal 102 is to conduct pilot measurements on specific carriers. Alternatively, the measurement controller 118 may specify when the pilot measurements are conducted.

In accordance with the teachings herein, the access terminal 102 may or may not employ a measurement gap on a given carrier when conducting a measurement on another carrier. For example, when the measurement controller 118 is conducting a measurement on a second carrier, a measurement gap may not be used on an active first carrier if the access terminal 102 is capable of concurrently receiving on the first and second carriers. Alternatively, a measurement gap may be used on the first carrier if the access terminal 102 is not capable of concurrently receiving on the first and second carriers. As shown in FIG. 1, the concurrent communication controller 114 may provide an indication (as represented by the line 120) of whether concurrent reception on the selected carriers is feasible. Accordingly, reception on the first carrier may be enabled or disabled at the transceiver(s) 112 during the measurement based on such an indication.

Also in accordance with the teachings herein, the access point 104 may restrict data transfers to or from the access terminal 102 in the event the access terminal 102 is conducting a measurement on a carrier. For example, a subframe data transfer controller 122 may identify one or more subframes that occur before or after the access terminal 102 conducts the measurement. The subframe data transfer controller 122 may then restrict data transfers to or from the access terminal 102 during the identified subframe(s). For example, no data transfers may be scheduled during this time or only low priority data transfers may be scheduled during this time.

Sample measurement-related operations will now be described in more detail in conjunction with the flowcharts of FIGS. 2-5. For convenience, the operations of FIGS. 2-5 (or any other operations discussed or taught herein) may be described as being performed by specific components (e.g., the components of FIG. 1 or FIG. 6). It should be appreciated, however, that these operations may be performed by other types of components and may be performed using a different number of components. It also should be appreciated that one or more of the operations described herein may not be employed in a given implementation.

Figure 2:
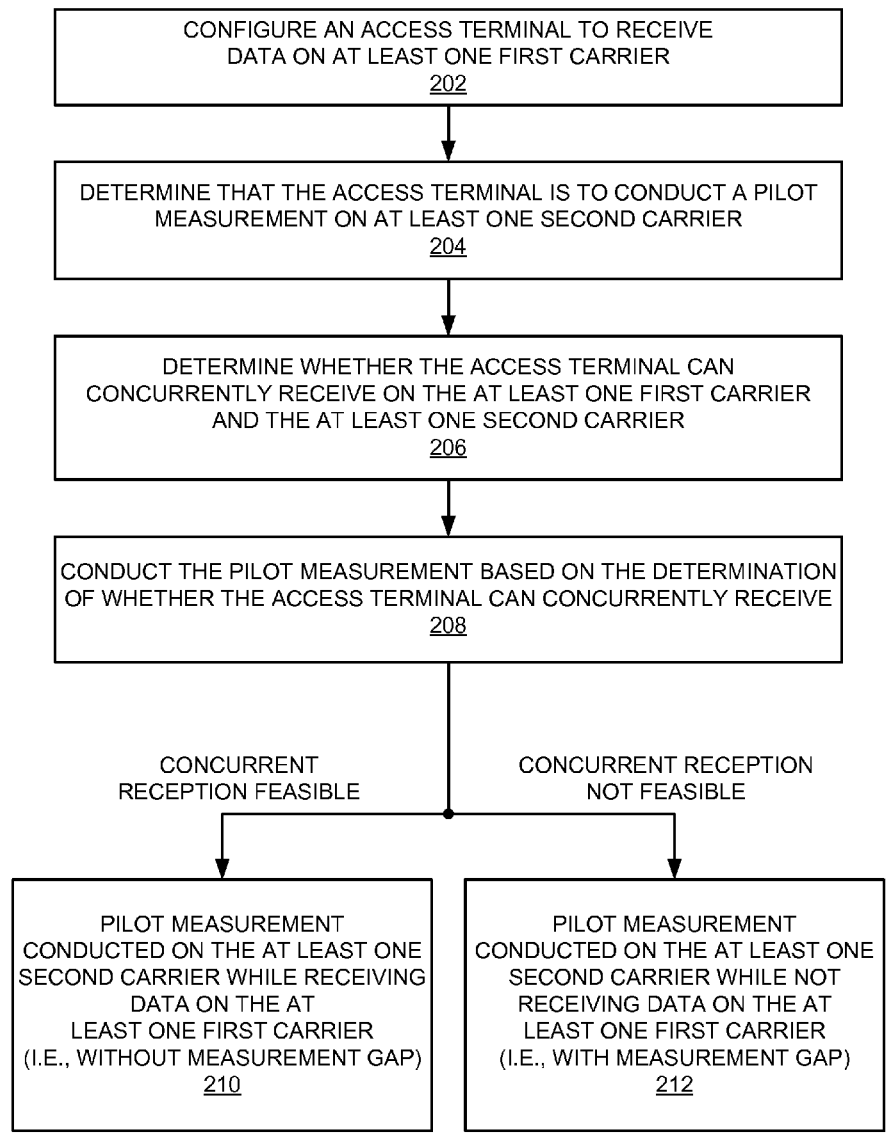
FIG. 2 is a flowchart of several sample aspects of operations that may be performed in conjunction with determining how to conduct a measurement based on whether an access terminal can concurrently receive on multiple carriers.

FIG. 2 illustrates sample operations that may be performed (e.g. at an access terminal) in conjunction with conducting measurements at an access terminal. For purposes of illustration, these operations are described in the context of an implementation where an access terminal conducts pilot measurements and where measurement gaps may be employed during a measurement. It should be appreciated that the teachings herein may be applicable to other implementations that use different terminology or that use different techniques. For example, pilot measurements as taught herein may be referred to as reference signal measurements in some implementations (e.g., an LTE-based implementation). Also, some implementations may employ a scheme known as discontinuous reception and thereby achieve similar results as may be obtained through the use of measurement gaps.

As represented by block 202, at some point in time, an access terminal is configured to receive data on at least one first carrier. For example, the serving access point for the access terminal may allocate a set of carriers that are to be used for communication between the access point and the access terminal. Here, the access point may indicate that the access terminal can expect to receive data on certain carriers. Hence, the access terminal (e.g., a communication controller of the access terminal) may configure its receiver(s) to receive data on the carrier(s) where data is expected.

As represented by block 204, at some point in time, it is determined that the access terminal is to conduct a pilot measurement on at least one second carrier. Here, a decision is made to conduct a measurement on one or more of the carriers that were allocated as described at block 202. For example, the access point may send a message to the access terminal, whereby the message requests the access terminal to conduct a pilot measurement on a specific carrier or specific carriers. As discussed in more detail below, the at least one second carrier may comprise a carrier that was not configured to receive data or a carrier that was configured to receive data as described at block 202.

As represented by block 206, a determination is then made as to whether the access terminal can concurrently receive on the at least one first carrier and the at least one second carrier. This may involve determining whether a receiver or multiple receivers in the access terminal is/are capable of concurrent reception on different carriers.

As one example, in a case where only one receiver is available, this decision may involve determining whether the receiver can concurrently receive on the carriers. This may be the case, for example, where the carriers are concurrent or within the same band, and where the receiver is able to receive over the entire bandwidth encompassing the carriers (e.g., the access terminal is able to provide appropriate receiver front-end tuning and baseband processing).

As another example, in a case where the access terminal has multiple receivers, the decision of block 206 may involve determining whether a spare receiver is available for conducting the measurement on the at least one second carrier. Thus, if a spare receiver is available for the pilot measurement, current reception may be feasible. Accordingly, in some aspects, the determination of whether the access terminal can concurrently receive comprises determining whether the access terminal includes a plurality of receivers available for receiving on the at least one first carrier and the at least one second carrier.

As yet another example, in a case where the access terminal is already operating on (e.g., active on) all of the allocated carriers, the access terminal may perform measurements on those carriers without having to use a measurement gap. In this case, the access terminal may process already available samples on a given carrier to extract pilot signal information from this received data. Thus, the access terminal does not need to change RF receiver settings (e.g., change local oscillator tuning for the RF front-end) to conduct a measurement.

As represented by block 208, the access terminal conducts the pilot measurement based on the determination of block 206.

For example, as represented by block 210, if concurrent reception is feasible, the access terminal conducts a pilot measurement on the at least one second carrier while receiving data on the at least one first carrier. Thus, the pilot measurement may be conducted without using a measurement gap on the at least one first carrier. For example, as discussed above, the access terminal may use a single receiver to receive on all of these carriers, the access terminal may process the data being received on a carrier to be measured and thereby obtain pilot measurement information for that carrier, or the access terminal may use one or more receivers for receiving data and use one or more other receivers for conducting the pilot measurement(s).

Conversely, as represented by block 212, if concurrent reception is not feasible, the access terminal conducts a pilot measurement on the at least one second carrier while not receiving data on the at least one first carrier. Thus, in this case, a measurement gap may be used on the at least one first carrier while the pilot measurement is conducted on the at least one second carrier.

The above scheme may be applied to other carriers as well. For example, at block 202, an access terminal may be operating on a first carrier (f1) and a second carrier (f2). At block 204, a determination is made that the access terminal is to conduct a measurement on a third carrier (f3). In this case, if it is determined that the access terminal can concurrently receive on the first and third carriers at block 206, the access terminal may temporarily stop receiving on f2 and, instead, receive on f3 to conduct the measurement (blocks 208 and 210). For example, if a single receiver is being used to receive on f1 and f2, the access terminal may retune the receiver to stop receiving on f2 and, instead, receive on f3. As another example, if a first receiver is being used on f1 and a second receiver is being used on f2, the access terminal may retune the second receiver to stop receiving on f2 and, instead, receive on f3. In contrast, if is determined at block 206 that the access terminal cannot concurrently receive on the first and third carriers, a measurement gap may be used on the first carrier while the access terminal conducts the measurement on the third carrier (blocks 208 and 212).

In a scenario where a receiver switches from receiving on one carrier to receiving on another carrier (e.g., as described in the preceding paragraph), provisions may be made in accordance with the teachings herein to mitigate potential data loss that may occur as a result of such a switch.

For example, as mentioned above, an access terminal may retune its RF receiver to stop receiving on one carrier and start receiving on another carrier. For a contiguous carrier scenario (e.g., a scenario where the carriers are in the same band), this may involve retuning the local oscillator, which may take on the order of a few tens of microseconds. Thus, in this case, data loss may occur at the RF receiver when the RF receiver is being retuned.

For a non-contiguous carrier scenario (e.g., a scenario where the carriers are not in the same band), this process may involve deactivating the RF receiver front-end for one band and activating the RF receiver front-end for the other band, which may take on the order of a few hundred microseconds. In this case, the retuning of one RF receiver may affect reception at another RF receiver (e.g., due to the impact the switching has on the power supply for the RF receivers). Thus, in this case, data loss may occur at one RF receiver during the retuning of the other RF receiver.

As described above, the time needed for retuning may be relatively small in both the contiguous and the non-contiguous scenarios. Accordingly, the loss in data demodulation performance may be negligible and only one subframe (or a few subframes) may be lost. Since the network may be made aware of when such retuning occurs, the network may take measures to avoid scheduling the access terminal on this subframe or these subframes.

Figure 3:
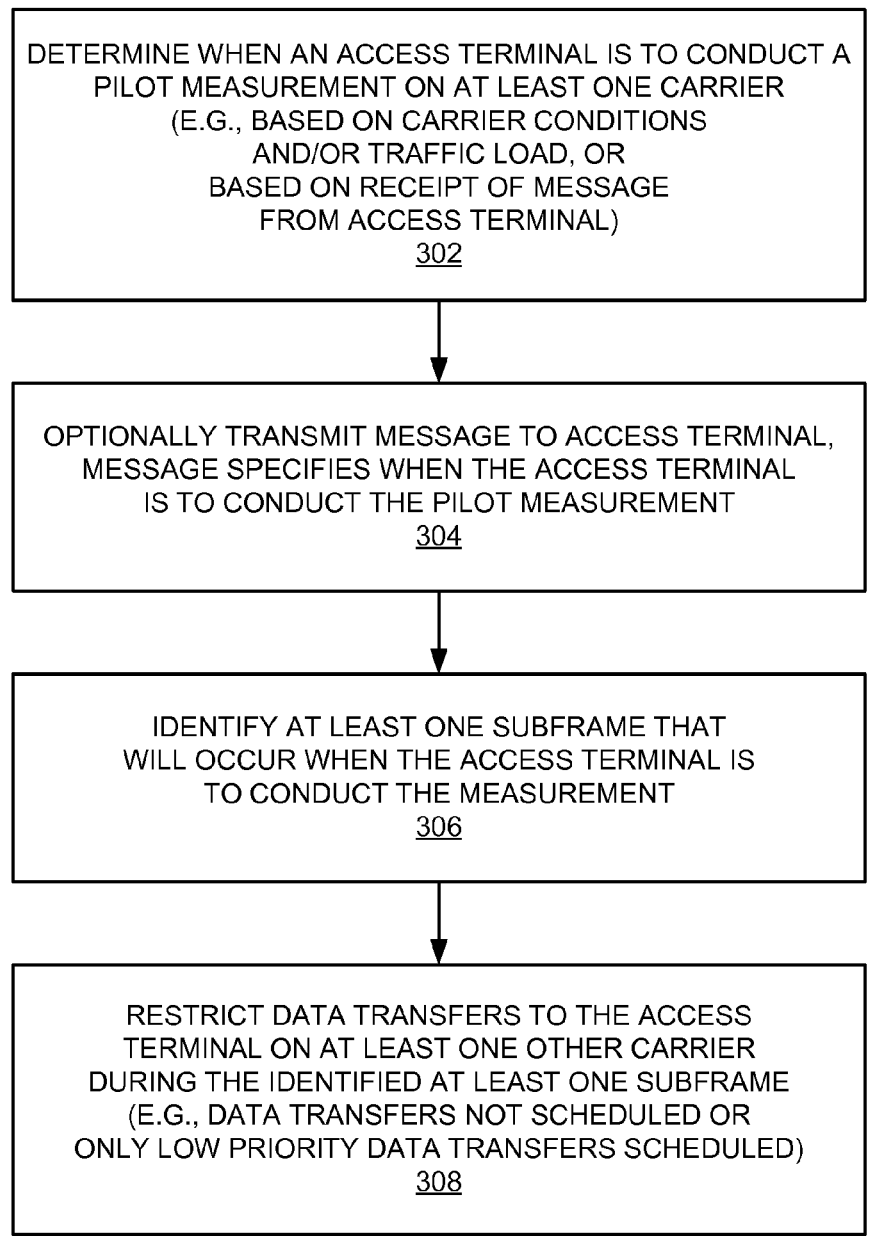
FIG. 3 is a flowchart of several sample aspects of operations that may be performed in conjunction with restricting data transfers during at least one subframe if an access terminal is conducting a measurement.

FIG. 3 describes a sample scheme that may be performed to restrict data transfers during such subframes. These operations may be performed by an access point or some other suitable network entity.

As represented by block 302, the scheme involves determining when an access terminal is to conduct a pilot measurement on at least one carrier. In a typical case, this determination is made at the serving access point for the access terminal based on one or more factors.

As an example of one factor, a decision to conduct a measurement on a carrier may be made based on signal conditions on one or more carriers (e.g., carriers currently being used by and/or carriers that may be used by the access terminal). For example, the access point may determine that signal conditions are deteriorating (or improving) on a given carrier based on prior measurement reports that the access point received from the access terminal and/or other access terminals. In such a case, in preparation for moving traffic to a better carrier or carriers, the access point may request the access terminal to conduct one or more measurements on the new carrier(s).

As an example of another factor, a decision to conduct a measurement on a carrier may be made based on the traffic load for the access terminal. For example, the access point may determine that the traffic load for the access terminal has increased (e.g., due to the applications being run on the access terminal). In such a case, a decision may be made to allocate at least one additional carrier for the access point. In preparation for allocating the new carrier(s), the access point may request the access terminal to conduct one or more measurements on the new carrier(s).

An access point may request the access terminal to conduct a measurement in various ways. In some cases, the access point may request that the access point conduct a measurement immediately. In some cases, the access point may request that the access point conduct a measurement at a certain time or during a certain set of subframes. In some cases, the access point may request that the access point conduct a series of measurements at specified times (e.g., at regular intervals).

In some implementations, an access terminal may determine when it is going to conduct a measurement. Here, the access terminal may send a message to the network (e.g., the serving access point), whereby the message includes an indication that specifies when the access terminal is to conduct the pilot measurement. In such a case, the determination of block 302 may thus comprise receiving such a message from the access terminal.

As represented by block 304, in cases where the network (e.g., the serving access point) determines when the access terminal is to conduct a pilot measurement, the network transmits a message to the access terminal to request that the access terminal perform a measurement. This message may include an indication that specifies when the access terminal is to conduct the pilot measurement.

As represented by block 306, at least one subframe that will occur when the access terminal is to conduct the measurement is identified. In particular, it is desirable to identity any subframes where there may be a loss of data as a result of the access terminal switching to receive (or transmit) on a different carrier or carriers. For example, the access point may identify at least one subframe that will occur before or after the access terminal conducts the pilot measurement, since such a subframe may occur at the time that the access terminal is switching its receive capabilities.

Here, the identification of at least one subframe that occurs before or after the access terminal conducts a pilot measurement may include: identifying at least one subframe that occurs before the pilot measurement, identifying at least one subframe that occurs after the pilot measurement, or identifying at least one subframe that occurs before the pilot measurement and identifying at least one subframe that occurs after the pilot measurement.

In some aspects, the subframes affected by an access terminal switching its receive capabilities may depend on whether the access terminal is performing inter-band retuning or intra-band retuning. For example, as discussed above, inter-band tuning may take longer (e.g., may be more likely to occur during more than one subframe) than intra-band retuning. In addition, inter-band tuning may involve the use of multiple receivers which, in some cases, may not cause data loss on the active carrier. Accordingly, in some aspects, the identification of the at least one subframe may comprise determining whether the access terminal is performing inter-band retuning or intra-band retuning to conduct the pilot measurement.

As represented by block 308, data transfers to or from the access terminal on at least one other carrier are then restricted during the subframe(s) identified at block 306. Thus, when the access terminal commences a pilot measurement at the specified time (e.g., as requested by the access point), potential data loss that may otherwise result from a receiver reconfiguration at the access terminal may be mitigated (e.g., avoided).

The restriction of block 308 may take various forms. In some cases, restricting data transfers involves not scheduling any data transfers on the at least one other carrier during the identified subframe(s). In some cases, restricting data transfers involves only scheduling low priority data transfers on the at least one other carrier during the identified subframe(s).

Figure 4:
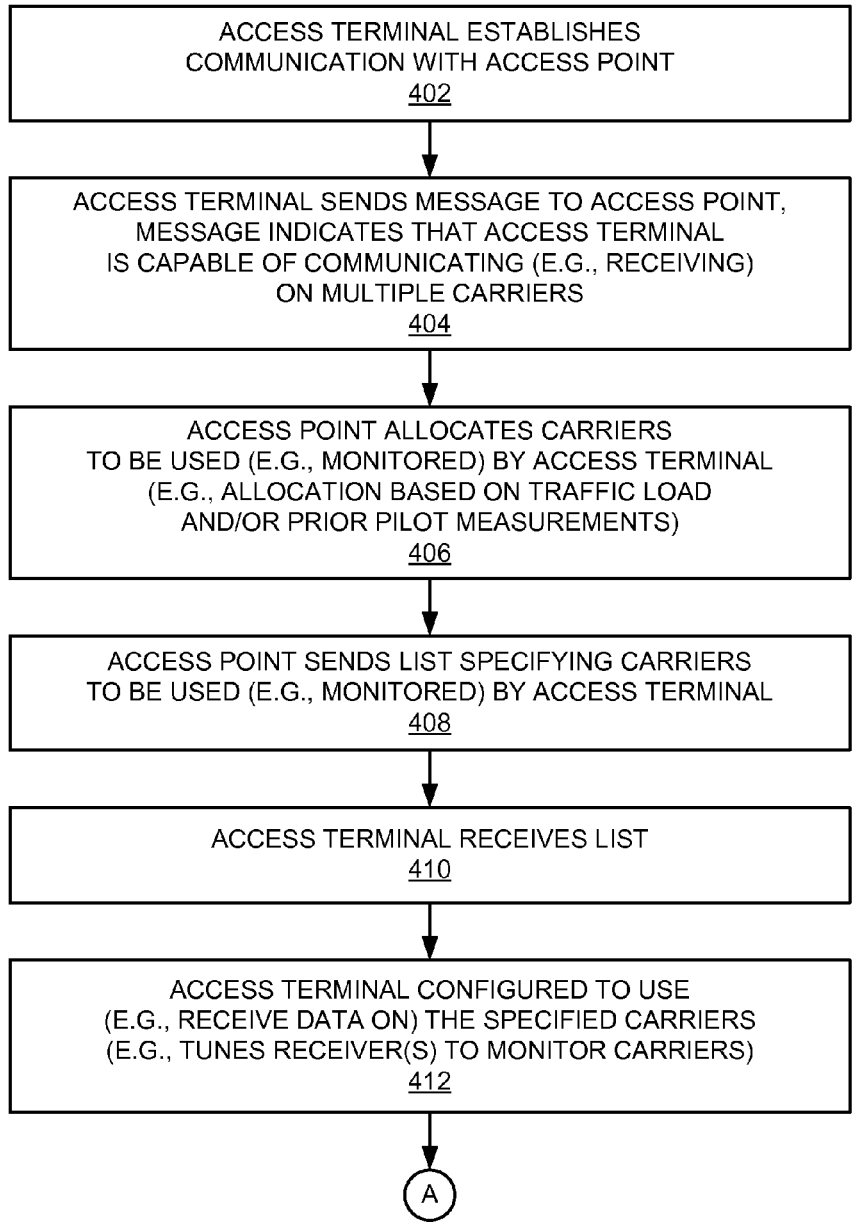
FIGS. 4 and 5 are a flowchart of several sample aspects of operations that may be performed in conjunction with conducting measurements in a carrier aggregation scenario.
Figure 5:
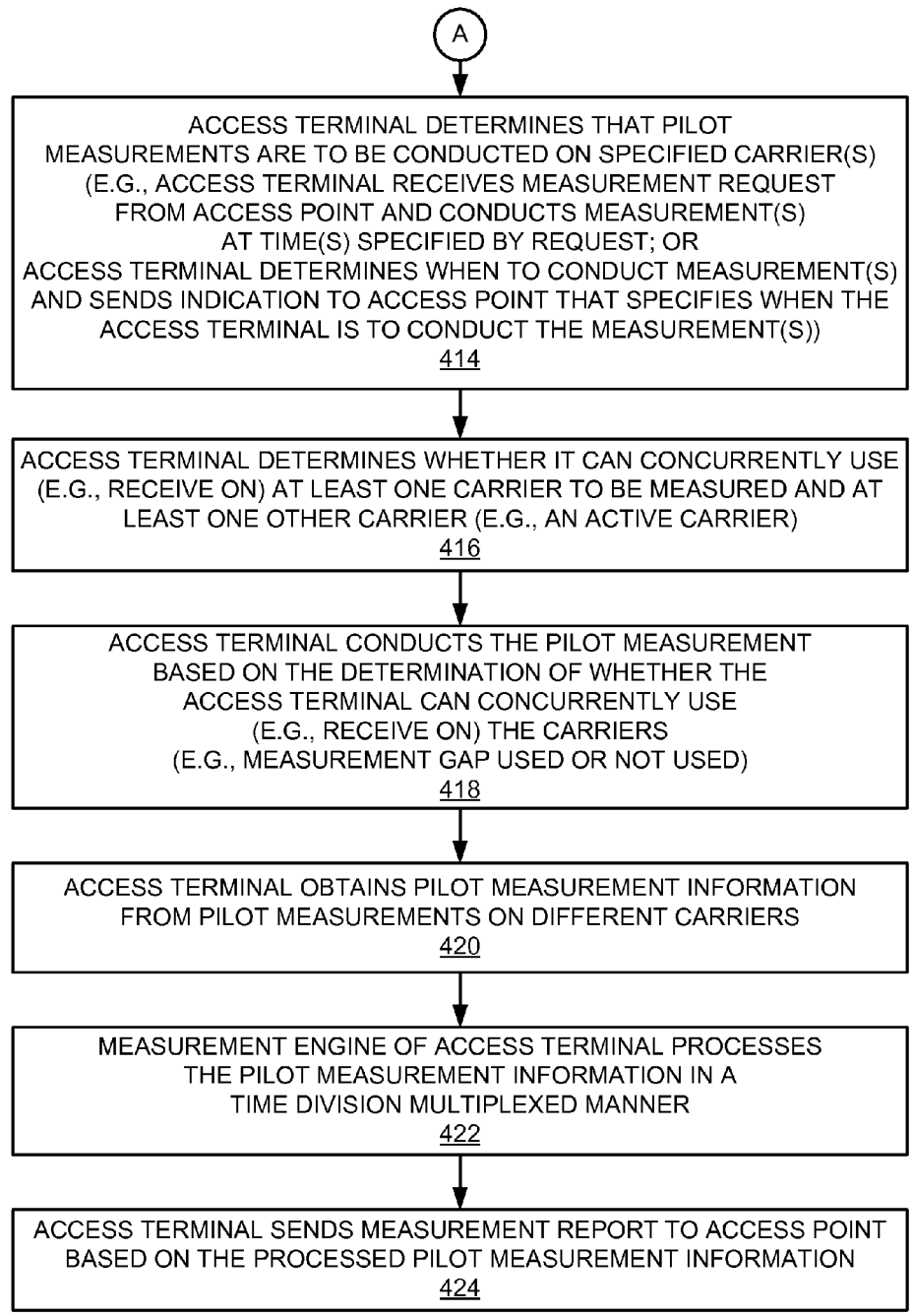

Here, the restriction of data transfers to or from the access terminal may include: restricting transfers to the access terminal, restricting transfers from the access terminal, or restricting transfers to the access terminal and restricting transfers from the access terminal For further purposes of illustration, a detailed example of how measurements may be taken in accordance with the teachings herein will now be presented with reference to the flowchart of FIGS. 4 and 5. In this example, an access terminal (e.g., a UE) cooperates with an access point (e.g., an eNodeB) to conduct pilot measurements in a carrier aggregation scenario. It should be appreciated that these operations may be performed by other entities and in other scenarios.

As represented by block 402 of FIG. 4, at some point in time the access terminal establishes communication with the access point. For example, the access terminal may be handed-over to the access point, may be powered-on while within the coverage of the access point, and so on. In conjunction with establishing communication (or at some other time), the access terminal and the network (e.g., the access point) exchange carrier capability information.

For example, as represented by block 404, the access terminal may send a message to the access point whereby the message indicates that the access terminal is capable of communicating (e.g., receiving) on multiple carriers. For example, the message may indicate that the access terminal has a certain number of receivers. As another example, the message may indicate that the access terminal is able to concurrently receive on certain carriers (e.g., one or more contiguous carriers). In some cases, the message may indicate the specific carriers on which the access terminal may concurrently receive.

As represented by block 406, as a result of receiving the information of block 404, the access point allocated carriers to be used (e.g., monitored) by the access terminal. This carrier allocation may be based on one or more factors.

As an example of one factor, a decision to allocate one or more carriers may be made based on the traffic load for the access terminal. For example, the access point may determine that the traffic load for the access terminal requires the use of a certain number of carriers. In such a case, the access point may allocate this quantity of carriers for the access terminal.

As an example of another factor, an allocation decision may be made based on signal conditions on one or more carriers. For example, the access point may determine that signal conditions are poor (or good) on a given carrier based on prior measurement reports that the access point received from other access terminal. In such a case, the access point may allocate a carrier other than the poor carrier (or allocate the good carrier) for the access terminal.

As represented by block 408, the access point sends a list to the access terminal, whereby the list specifies the carriers to be used (e.g., monitored) by the access terminal. The access terminal receives this list as represented by block 410.

As represented by block 412, the access terminal is then configured to use (e.g., receive data on) the specified carriers. For example, the access terminal may tune its receiver(s) to start monitoring the specified carrier(s). This may involve retuning the corresponding front-end of each RF receiver that is used to receive the specified carrier(s).

As represented by block 414 of FIG. 5, the access terminal determines that pilot measurements are to be conducted on one or more specified carriers. For example, upon sending the list of carriers to be monitored at block 408, the access point may request the access terminal to commence conducting pilot measurement on these carriers. In some aspects, the operations of block 414 may correspond to the operations described above at blocks 204 and 302.

As represented by block 416, the access terminal determines whether it can concurrently use (e.g., receive on) at least one carrier to be measured and at least one other carrier (e.g., an active carrier that is actively receiving data). In some aspects, the operations of block 416 may thus correspond to the operations described above at block 206.

As represented by block 418, the access terminal conducts the pilot measurement based on the determination of block 416. In some aspects, the operations of block 418 may correspond to the operations described above at blocks 208-212. Thus, a measurement gap may not be employed in cases where concurrent use of (e.g., reception on) the carriers is feasible. For example, the access terminal may continue to demodulate data received on a first subset of carriers while performing inter-frequency measurements on another set of carriers. Conversely, a measurement gap may be employed in cases where concurrent use is not feasible. For example, the access terminal may use measurement gaps on a first subset of carriers while performing inter-frequency measurements on another set of carriers.

As represented by block 420, the access terminal may thus obtain pilot measurement information (e.g., pilot signal samples) from pilot measurements conducted on different carriers. For example, first pilot carrier information may be obtained from measurements on at least one first carrier and second pilot carrier information may be obtained from measurements on at least one second carrier.

As represented by block 422, in some implementations, the access terminal may reuse a single measurement engine for processing pilot measurement information from different carriers. For example, the measurement engine may process the first pilot carrier information and the second pilot carrier information in a time division multiplexed manner.

As represented by block 424, the access terminal sends a measurement report to the access point. For example, the measurement report may include information (e.g., pilot signal strength and access point identifier information) derived by the measurement engine from the received pilot information.

Figure 6:
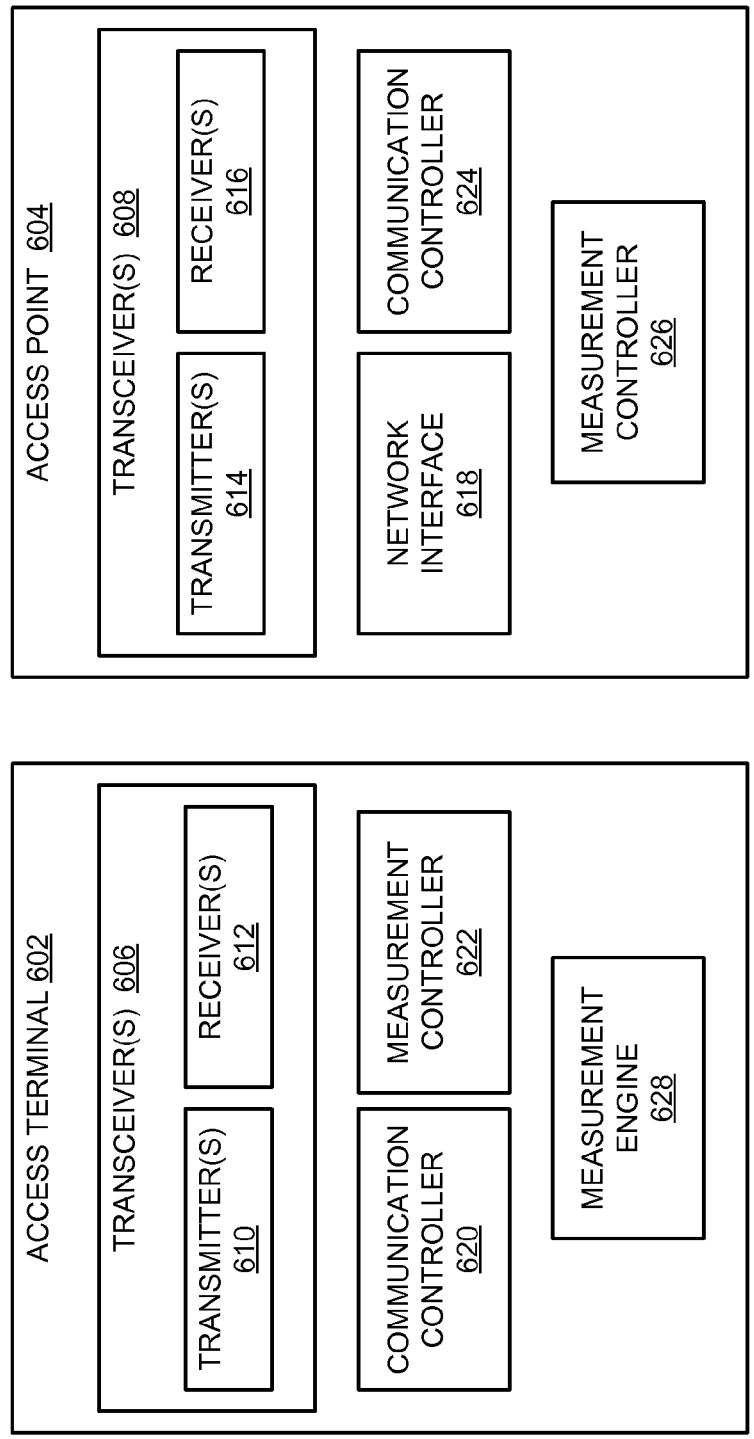
FIG. 6 is a simplified block diagram of several sample aspects of components that may be employed in communication nodes.

FIG. 6 illustrates several sample components (represented by corresponding blocks) that may be incorporated into nodes such as an access terminal 602 and an access point 604 (e.g., corresponding to the access terminal 102 and the access point 104, respectively) to perform measurement-related operations as taught herein. The described components also may be incorporated into other nodes in a communication system. For example, other nodes in a system may include components similar to those described for the access terminal 602 and the access point 604 to provide similar functionality. Also, a given node may contain one or more of the described components. For example, an access terminal may contain multiple transceiver components that enable the access terminal to operate on multiple carriers and/or communicate via different technologies.

As shown in FIG. 6, the access terminal 602 and the access point 604 each include one or more transceivers (as represented by transceiver(s) 606 and transceivers(s) 608, respectively) for communicating with other nodes. Each transceiver 606 includes one or more transmitters (represented by the transmitter(s) 610) for sending signals (e.g., message, indications, pilot signals) and one or more receivers (represented by the receiver(s) 612) for receiving signals (e.g., messages, indications, pilot signals) and for performing other measurement-related operations (e.g., conducting pilot measurements, obtaining pilot information from the pilot measurement). Similarly, each transceiver 608 includes one or more transmitter(s) 614 for sending signals and for performing other measurement-related operations (e.g., transmitting a message that specifies when an access terminal is to conduct a pilot measurement) and one or more receiver(s) 616 for receiving signals.

The access point 604 also includes a network interface 618 for communicating with other nodes (e.g., network entities). For example, the network interface 618 may be operable to communicate with one or more network entities via a wire-based or wireless backhaul. In some aspects, the network interface 618 may be implemented as a transceiver (e.g., including transmitter and receiver components) operable to support wire-based or wireless communication.

The access terminal 602 and the access point 604 also include other components that may be used in conjunction with measurement-related operations as taught herein. For example, the access terminal 602 may include a communication controller 620 (e.g., corresponding in some aspects to the controller 114 of FIG. 1) for managing communication on one or more carriers (e.g., configuring an access terminal to receive data on at least one carrier, determining whether an access terminal can concurrently receive on multiple carriers, receiving a list that specifies carriers to be monitored, tuning one or more receivers) and for providing other related functionality as taught herein. In some implementations, operations of the communication controller 620 may be implemented in the transceiver(s) 612. The access terminal 602 also may include a measurement controller 622 (e.g., corresponding in some aspects to the controller 118 of FIG. 1) for managing measurements on one or more carriers (e.g., determining that an access terminal is to conduct a pilot measurement on at least one carrier, receiving an indication that specifies when an access terminal is to conduct a pilot measurement, commencing a pilot measurement at a time specified by the indication, determining when an access terminal is to conduct a pilot measurement, sending an indication that specifies when an access terminal is to conduct a pilot measurement) and for providing other related functionality as taught herein. In some implementations, operations of the measurement controller 622 may be implemented in the receiver(s) 612. In addition, the access terminal 602 may include a measurement engine 628 for processing pilot measurement information (e.g., processing pilot measurement information in a time division multiplexed manner, providing measurement reports based on the processed pilot measurement information) and for providing other related functionality as taught herein. The access point 604 may include a communication controller 624 (e.g., corresponding in some aspects to the controller 122 of FIG. 1) for managing communication on one or more carriers (e.g., identifying at least one subframe that will occur before or after an access terminal conducts a pilot measurement, restricting data transfers to or from an access terminal on at least one carrier during the identified at least one subframe) and for providing other related functionality as taught herein. In some implementations, operations of the communication controller 624 may be implemented in the transceiver(s) 614. The access point 604 also may include a measurement controller 626 (e.g., corresponding in some aspects to the controller 116 of FIG. 1) for managing measurements performed by an access terminal on one or more carriers (e.g., determining when an access terminal is to conduct a pilot measurement) and for providing other related functionality as taught herein.

In some implementations, the components of FIG. 6 may be implemented in one or more processors (e.g., each of which uses and/or incorporates data memory for storing information or code used by the processor to provide this functionality). For example, some of the functionality represented by block 606 and some or all of the functionality represented by blocks 620, 622, and 624 may be implemented by a processor or processors of an access terminal and data memory of the access terminal (e.g., by execution of appropriate code and/or by appropriate configuration of processor components). Similarly, some of the functionality represented by block 608 and some or all of the functionality represented by blocks 618, 624, and 626 may be implemented by a processor or processors of an access point and data memory of the access point (e.g., by execution of appropriate code and/or by appropriate configuration of processor components).

Advantageously, the use of the techniques described herein may not have a significant impact on the battery life of an access terminal. For example, assume a scenario where an access terminal is operating only on carrier f1 and is asked to perform measurements on f3. If the access terminal has to measure f3 without a measurement gap, then the access terminal needs to activate the RF chain for f3 (e.g., non-contiguous case) or increase the sampling rate to encompass f1 and f3 (e.g., contiguous case). This would create a battery life impact; however this should be considered in comparison to the battery impact due to the measurement gap. If the access terminal were to take a measurement gap on f1, it would have to stay active on f1 at a later time to recover the data not received during the measurement gap. Thus, the battery impact with and without measurement gaps is similar, at least to a first order.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 7:
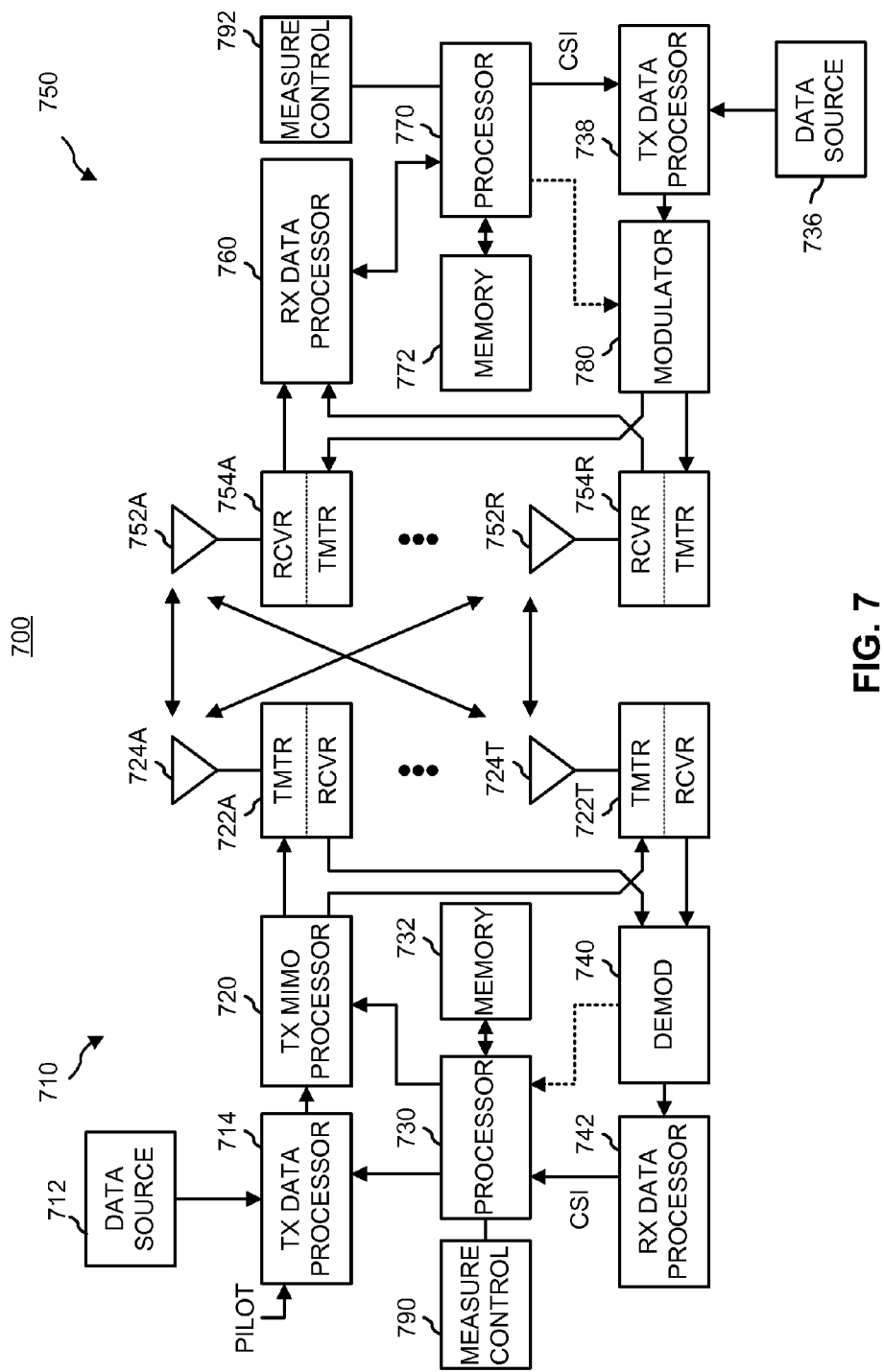
FIG. 7 is a simplified block diagram of several sample aspects of communication components.

FIG. 7 illustrates a wireless device 710 (e.g., an access point) and a wireless device 750 (e.g., an access terminal) of a sample MIMO system 700. At the device 710, traffic data for a number of data streams is provided from a data source 712 to a transmit (TX) data processor 714. Each data stream may then be transmitted over a respective transmit antenna.

The TX data processor 714 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 730. A data memory 732 may store program code, data, and other information used by the processor 730 or other components of the device 710.

The modulation symbols for all data streams are then provided to a TX MIMO processor 720, which may further process the modulation symbols (e.g., for OFDM). The TX MIMO processor 720 then provides $N_T$ modulation symbol streams to $N_T$ transceivers (XCVR) 722A through 722T. In some aspects, the TX MIMO processor 720 applies beam-forming weights to the symbols of the data streams and to the antenna from which the symbol is being transmitted.

Each transceiver 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 722A through 722T are then transmitted from $N_T$ antennas 724A through 724T, respectively.

At the device 750, the transmitted modulated signals are received by $N_R$ antennas 752A through 752R and the received signal from each antenna 752 is provided to a respective transceiver (XCVR) 754A through 754R. Each transceiver 754 conditions (e.g., filters, amplifies, and downconverts) a respective received signal, digitizes the conditioned signal to provide samples, and further processes the samples to provide a corresponding "received" symbol stream.

A receive (RX) data processor 760 then receives and processes the $N_R$ received symbol streams from $N_R$ transceivers 754 based on a particular receiver processing technique to provide $N_T$ "detected" symbol streams. The RX data processor 760 then demodulates, deinterleaves, and decodes each detected symbol stream to recover the traffic data for the data stream. The processing by the RX data processor 760 is complementary to that performed by the TX MIMO processor 720 and the TX data processor 714 at the device 710.

A processor 770 periodically determines which pre-coding matrix to use (discussed below). The processor 770 formulates a reverse link message comprising a matrix index portion and a rank value portion. A data memory 772 may store program code, data, and other information used by the processor 770 or other components of the device 750.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by the transceivers 754A through 754R, and transmitted back to the device 710.

At the device 710, the modulated signals from the device 750 are received by the antennas 724, conditioned by the transceivers 722, demodulated by a demodulator (DEMOD) 740, and processed by a RX data processor 742 to extract the reverse link message transmitted by the device 750. The processor 730 then determines which pre-coding matrix to use for determining the beam-forming weights then processes the extracted message.

FIG. 7 also illustrates that the communication components may include one or more components that perform measurement control operations as taught herein. For example, a measurement (measure) control component 790 may cooperate with the processor 730 and/or other components of the device 710 to send/receive signals to/from another device (e.g., device 750) in conjunction with measurement operations as taught herein. Similarly, a measure control component 792 may cooperate with the processor 770 and/or other components of the device 750 to send/receive signals to/from another device (e.g., device 710) in conjunction with measurement operations as taught herein. It should be appreciated that for each device 710 and 750 the functionality of two or more of the described components may be provided by a single component. For example, a single processing component may provide the functionality of the measure control component 790 and the processor 730 and a single processing component may provide the functionality of the measure control component 792 and the processor 770.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is operable to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 8:
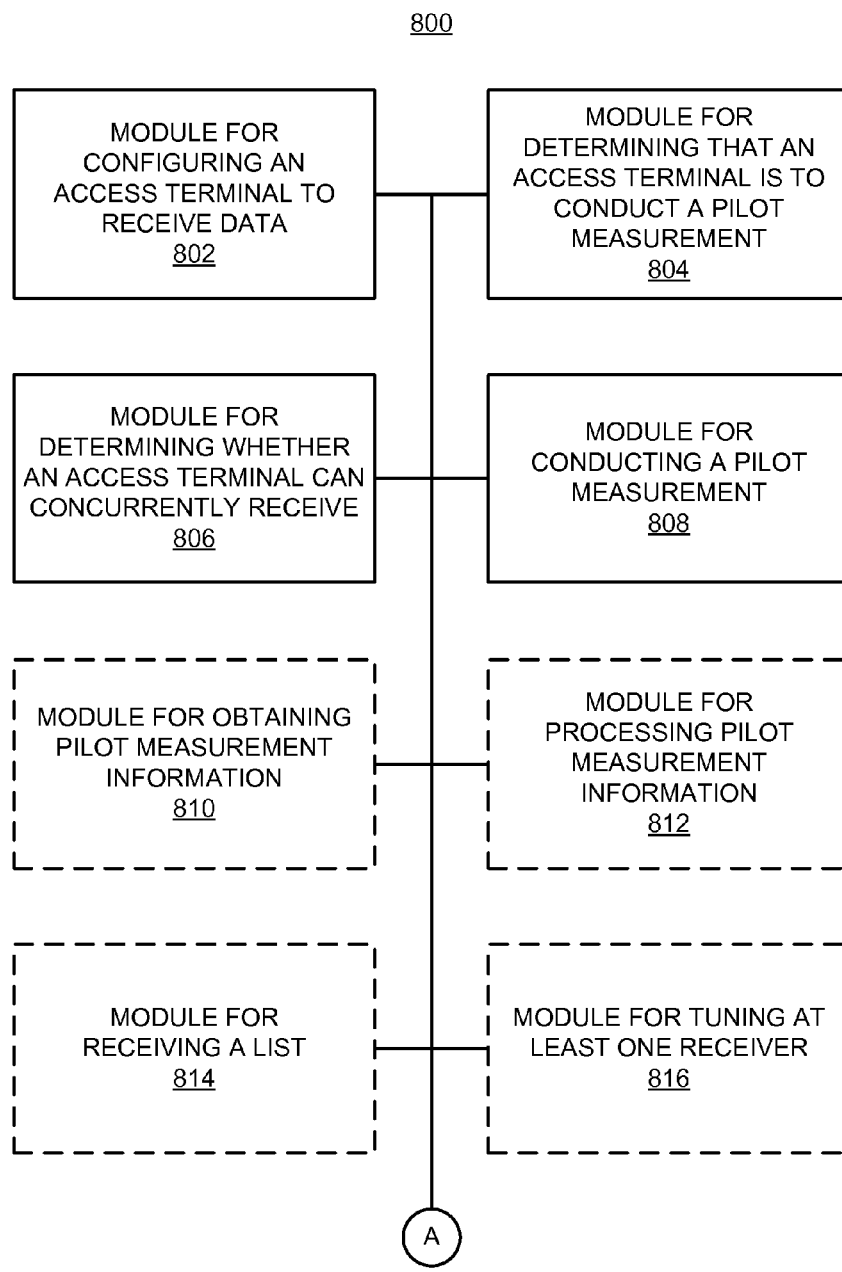
FIGS. 8-10 are simplified block diagrams of several sample aspects of apparatuses operable to facilitate conducting measurements in a multiple carrier scenario as taught herein.
Figure 9:
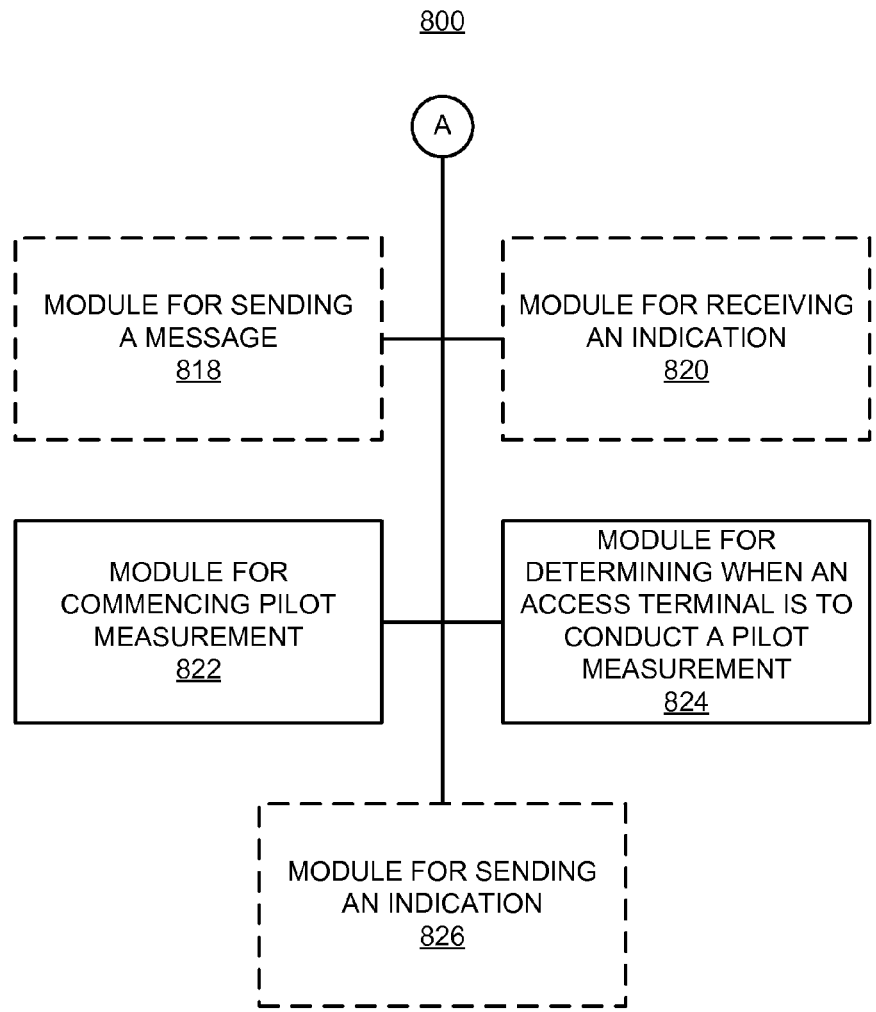
Figure 10:
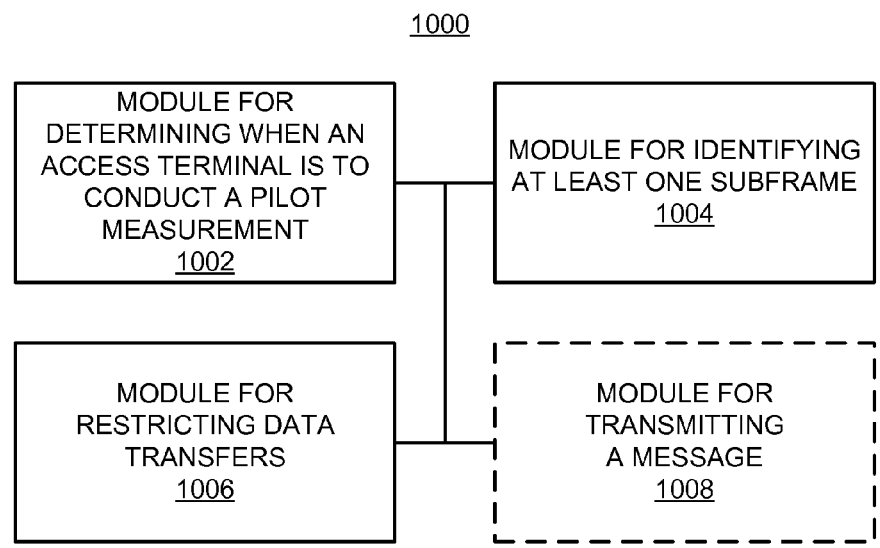

The functionality described herein (e.g., with regard to one or more of the accompanying figures) may correspond in some aspects to similarly designated "means for" functionality in the appended claims. Referring to FIGS. 8-10, apparatuses 800 and 1000 are represented as a series of interrelated functional modules. Here, a module for configuring an access terminal to receive data 802 may correspond at least in some aspects to, for example, a communication controller as discussed herein. A module for determining that an access terminal is to conduct a pilot measurement 804 may correspond at least in some aspects to, for example, a measurement controller as discussed herein. A module for determining whether an access terminal can concurrently receive 806 may correspond at least in some aspects to, for example, a communication controller as discussed herein. A module for conducting a pilot measurement 808 may correspond at least in some aspects to, for example, at least one receiver as discussed herein. A module for obtaining pilot measurement information 810 may correspond at least in some aspects to, for example, at least one receiver as discussed herein. A module for processing pilot measurement information 812 may correspond at least in some aspects to, for example, a measurement engine as discussed herein. A module for receiving a list 814 may correspond at least in some aspects to, for example, a communication controller as discussed herein. A module for tuning at least one receiver 816 may correspond at least in some aspects to, for example, a communication controller as discussed herein. A module for sending a message 818 may correspond at least in some aspects to, for example, a transmitter as discussed herein. A module for receiving an indication 820 may correspond at least in some aspects to, for example, a measurement controller as discussed herein. A module for commencing pilot measurement 822 may correspond at least in some aspects to, for example, a measurement controller as discussed herein. A module for determining when an access terminal is to conduct a pilot measurement 824 may correspond at least in some aspects to, for example, a measurement controller as discussed herein. A module for sending an indication 830 may correspond at least in some aspects to, for example, a measurement controller as discussed herein. A module for determining when an access terminal is to conduct a pilot measurement 1002 may correspond at least in some aspects to, for example, a measurement controller as discussed herein. A module for identifying at least one subframe 1004 may correspond at least in some aspects to, for example, a communication controller as discussed herein. A module for restricting data transfers 1006 may correspond at least in some aspects to, for example, a communication controller as discussed herein. A module for transmitting a message 1008 may correspond at least in some aspects to, for example, a transmitter as discussed herein.

The functionality of the modules of FIGS. 8-10 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 8-10 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   configuring an access terminal for communication on a plurality of carriers;
   determining when the access terminal is to conduct a pilot measurement on at least one carrier of the plurality of carriers;
   identifying at least one subframe that will occur before or after the access terminal conducts the pilot measurement; and
   restricting data transfers to or from the access terminal on at least one other carrier of the plurality of carriers during the identified at least one subframe.

2. The method of claim 1, wherein the restricting of data transfers comprises not scheduling data transfers to or from the access terminal on the at least one other carrier of the plurality of carriers during the identified at least one subframe.

3. The method of claim 1, wherein the restricting of data transfers comprises only scheduling low priority data transfers to or from the access terminal on the at least one other carrier of the plurality of carriers during the identified at least one subframe.

4. The method of claim 1, further comprising transmitting a message to the access terminal, wherein the message specifies when the access terminal is to conduct the pilot measurement.

5. The method of claim 1, wherein the determination of when the access terminal is to conduct the pilot measurement comprises receiving a message from the access terminal that specifies when the access terminal is to conduct the pilot measurement.

6. The method of claim 1, wherein the identification of the at least one subframe comprise determining whether the access terminal will perform inter-band retuning or intra-band retuning to conduct the pilot measurement.

7. The method of claim 1, wherein the method is performed by a serving access point for the access terminal.

8. An apparatus for communication, comprising:
   a carrier aggregation allocator operable to configure an access terminal for communication on a plurality of carriers;
   a measurement controller operable to determine when the access terminal is to conduct a pilot measurement on at least one carrier of the plurality of carriers; and
   a communication controller operable to identify at least one subframe that will occur before or after the access terminal conducts the pilot measurement, and further operable to restrict data transfers to or from the access terminal on at least one other carrier of the plurality of carriers during the identified at least one subframe.

9. The apparatus of claim 8, wherein the restricting of data transfers comprises not scheduling data transfers to or from the access terminal on the at least one other carrier of the plurality of carriers during the identified at least one subframe.

10. The apparatus of claim 8, wherein the restricting of data transfers comprises only scheduling low priority data transfers to or from the access terminal on the at least one other carrier of the plurality of carriers during the identified at least one subframe.

11. The apparatus of claim 8, wherein the determination of when the access terminal is to conduct the pilot measurement comprises receiving a message from the access terminal that specifies when the access terminal is to conduct the pilot measurement.

12. The apparatus of claim 8, wherein the identification of the at least one subframe comprise determining whether the access terminal will perform inter-band retuning or intra-band retuning to conduct the pilot measurement.

13. An apparatus for communication, comprising:
   means for configuring an access terminal for communication on a plurality of carriers:
   means for determining when the access terminal is to conduct a pilot measurement on at least one carrier of the plurality of carriers;
   means for identifying at least one subframe that will occur before or after the access terminal conducts the pilot measurement; and
   means for restricting data transfers to or from the access terminal on at least one other carrier of the plurality of carriers during the identified at least one subframe.

14. The apparatus of claim 13, wherein the restricting of data transfers comprises not scheduling data transfers to or from the access terminal on the at least one other carrier of the plurality of carriers during the identified at least one subframe.

15. The apparatus of claim 13, wherein the restricting of data transfers comprises only scheduling low priority data transfers to or from the access terminal on the at least one other carrier of the plurality of carriers during the identified at least one subframe.

16. The apparatus of claim 13, wherein the determination of when the access terminal is to conduct the pilot measurement comprises receiving a message from the access terminal that specifies when the access terminal is to conduct the pilot measurement.

17. The apparatus of claim 13, wherein the identification of the at least one subframe comprise determining whether the access terminal will perform inter-band retuning or intra-band retuning to conduct the pilot measurement.

18. A computer-program product, comprising:
   a non-transitory computer-readable medium comprising code for causing a computer to:
   configure an access terminal for communication on a plurality of carriers;
   determine when the access terminal is to conduct a pilot measurement on at least one carrier of the plurality of carriers;
   identify at least one subframe that will occur before or after the access terminal conducts the pilot measurement; and
   restrict data transfers to or from the access terminal on at least one other carrier of the plurality of carriers during the identified at least one subframe.

19. The computer-program product of claim 18, wherein the restricting of data transfers comprises not scheduling data transfers to or from the access terminal on the at least one other carrier of the plurality of carriers during the identified at least one subframe.

20. The computer-program product of claim 18, wherein the restricting of data transfers comprises only scheduling low priority data transfers to or from the access terminal on the at least one other carrier of the plurality of carriers during the identified at least one subframe.

21. The computer-program product of claim 18, wherein the determination of when the access terminal is to conduct the pilot measurement comprises receiving a message from the access terminal that specifies when the access terminal is to conduct the pilot measurement.

22. The computer-program product of claim 18, wherein the identification of the at least one subframe comprise determining whether the access terminal will perform inter-band retuning or intra-band retuning to conduct the pilot measurement.

\* \* \* \* \*